(12) United States Patent
Liu et al.

(10) Patent No.: US 12,229,776 B2
(45) Date of Patent: Feb. 18, 2025

(54) CASH HANDLING SYSTEM AND CASH TRANSACTION METHOD

(71) Applicant: Masterwork Automodules Tech Corp. Ltd, Taipei (TW)

(72) Inventors: Ming-Hsun Liu, Taipei (TW); Yang-Chun Lo, New Taipei (TW)

(73) Assignee: Masterwork Automodules Tech Corp. Ltd, Taipei (TW)

( * ) Notice: Subject to any disclaimer, the term of this patent is extended or adjusted under 35 U.S.C. 154(b) by 472 days.

(21) Appl. No.: 16/950,873

(22) Filed: Nov. 17, 2020

(65) Prior Publication Data

US 2021/0065196 A1    Mar. 4, 2021

Related U.S. Application Data

(63) Continuation of application No. 16/141,924, filed on Sep. 25, 2018, now abandoned.

(30) Foreign Application Priority Data

Jul. 10, 2018 (TW) .................................. 107123866
Sep. 4, 2018 (MO) ......................................... I/1583

(51) Int. Cl.
*G06Q 20/40* (2012.01)
*G06Q 20/10* (2012.01)
*G06Q 20/20* (2012.01)

(52) U.S. Cl.
CPC ..... *G06Q 20/40145* (2013.01); *G06Q 20/108* (2013.01); *G06Q 20/20* (2013.01)

(58) Field of Classification Search
CPC ........... G06Q 20/40145; G06Q 20/108; G06Q 20/20; G06Q 20/18; G06Q 20/202
See application file for complete search history.

(56) References Cited

U.S. PATENT DOCUMENTS 9,177,194 B2 * 11/2015 Sundström ........... G06V 40/161
10,354,126 B1 * 7/2019 Nagalla ............ G06Q 20/40145
(Continued)

OTHER PUBLICATIONS

Haritaoglu, Ismail, and Myron Flickner. "Detection and tracking of shopping groups in stores." Proceedings of the 2001 IEEE Computer Society Conference on Computer Vision and Pattern Recognition. CVPR 2001. vol. 1. IEEE, 2001. (Year: 2001).*
(Continued)

*Primary Examiner* — David P Sharvin
*Assistant Examiner* — Brock Turk
(74) *Attorney, Agent, or Firm* — McClure, Qualey & Rodack, LLP (57) ABSTRACT

A cash handling system and a cash transaction method are provided. The cash handling system includes at least one order terminal and a cash payment terminal. The cash payment terminal communicates with the order terminal. The order terminal captures a first image, and at least one piece of first face data is included in the first image. The order terminal obtains order data and generates client data according to the order data and the at least one piece of first face data. The at least one piece of first face data is linked to the order data. The cash payment terminal obtains the client data, and the client data includes the order data and the at least one piece of first face data. The cash payment terminal captures a second image. When specific face data appears in the second image, the cash payment terminal performs a payment operation according to specific order data linked to the specific face data.

1 Claim, 9 Drawing Sheets

(56) References Cited

U.S. PATENT DOCUMENTS

| | | | | |
|---|---|---|---|---|
| 2014/0172707 A1* | 6/2014 | Kuntagod | ............ | G06Q 20/405 705/44 |
| 2015/0127485 A1* | 5/2015 | Kakizawa | .......... | G06Q 30/0613 705/26.41 |
| 2016/0323274 A1* | 11/2016 | Chandrasekaran | .... | G06Q 20/20 |
| 2018/0352150 A1* | 12/2018 | Purwar | .............. | G06K 9/00255 |

OTHER PUBLICATIONS

Aru, Okereke Eze, and Ihekweaba Gozie. "Facial verification technology for use in ATM transactions." American Journal of Engineering Research (AJER) 2.5 (2013): 188-193. (Year: 2013).*

* cited by examiner

CASH HANDLING SYSTEM AND CASH TRANSACTION METHOD

CROSS-REFERENCE TO RELATED APPLICATION

This application is a continuation application of and claims priority benefit of a prior application Ser. No. 16/141,924, filed on Sep. 25, 2018, now pending. The prior application Ser. No. 16/141,924 claims the priority benefit of Taiwan application serial no. 107123866, filed on Jul. 10, 2018, and Macau application serial no. 1/1583, filed on Sep. 4, 2018. The entirety of the above-mentioned patent applications is hereby incorporated by reference herein and made a part of this specification.

BACKGROUND

Technical Field

The disclosure relates to an application technology of a cash handling apparatus. More particularly, the disclosure relates to a cash handling system and a cash transaction method combining a face recognition function and a cash handling function.

Description of Related Art

A variety of apparatuses are aimed to reduce human resources allocated for transactions, saving business owners operational costs, and enhancing consumers' experiences. Through automated teller machines (ATM), users can receive bank related services such as depositing, withdrawing, transferring, etc. at their leisure. Currently, automated teller machines provide a single function, that is, the function of unmanned banking. The automated point of sale (POS) systems may be implemented on walls or pillars, through ticket booths or information booths (kiosks), consumers may select related products/services (e.g., meals and movies) to generate orders and checkout. Nonetheless, the automated point of sale systems will still need to manually identify the consumers with their associated orders.

Therefore, to combine the automated teller machines with the automated point of sale systems to provide a more convenient service for business owners and the consumers is an important issue in this field.

SUMMARY

The disclosure provides a cash handling system and a cash transaction method capable of combining a face recognition function with a cash handling function to link order data and face data of a consumer, conserving human resources at cash payment terminals or cash payment counters, and enhancing applications of automated teller machines.

In an embodiment of the disclosure, a cash handling system includes at least one order terminal and a cash payment terminal. The cash payment terminal communicates with the order terminal. The order terminal performs the following steps. A first image is obtained, and the first image includes at least one piece of first face data. Order data is obtained and client data is generated according to the order data and the first face data. The first face data is linked to the order data. The cash payment terminal performs the following steps. The client data is obtained, and the client data includes the order data and the first face data. A second image is captured. When specific face data appears in the second image, a payment operation is performed according to specific order data linked to the specific face data. The specific face data is one of the at least one piece of first face data. The specific order data is one of a plurality of pieces of order data.

In an embodiment of the disclosure, a cash transaction method includes the following steps. A first image is captured through at least one order terminal, and the first image includes at least one piece of first face data. Order data is obtained through at least one order terminal, and a client data is generated according to the order data and the first face data. The first face data is linked to the order data. The client data is obtained through the cash payment terminal, and the client data includes the order data and the first face data. A second image is obtained through the cash payment terminal. When specific face data appears in the second image, a payment operation is performed through the cash payment terminal according to specific order data linked to the specific face data. The specific face data is one of the at least one piece of first face data. The specific order data is one of a plurality of pieces of order data.

Based on the above, the embodiments of the disclosure use a face recognition technology to capture face data as a recognition reference while the user orders on an order terminal, and face data is linked to order data to make client data. After the user completes ordering, the client data is transmitted from the order terminal to the cash payment terminal or the application server. The cash payment terminal or the application server identifies the user in front of a camera of the cash payment terminal through the face feature data in the client data. After identifying the specific face feature data, the cash payment terminal performs the payment operation through order data linked to the specific face feature data. In this way, the cash payment terminal may link the order data and the face feature data of the user without manual operation, as such, human resources may be conserved at the cash payment terminal or the cash payment counter. Furthermore, in the embodiments, the face picture having a large area in the first image acts as the basis for generating the face data, and the face data is clustered through the data clustering algorithm. In this way, data volume of the face data is reduced, face recognition is more accurate, and face recognition efficiency and success rate of the cash payment terminal are enhanced. In addition, in this embodiment, the camera having a function of detecting depth of field is used to determine depth of field information corresponding to each face picture. Hence, which user is closer to the order terminal or the cash payment terminal is known, and the face picture of the user is preferentially subjected to be captured and recognized, so as to increase face recognition efficiency.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The embodiments of the disclosure combine a face recognition function and a cash handling function to link order data and a physiological feature of a consumer, enabling an electronic system to automatically and effectively perform a subsequent payment operation on the order data corresponding to the consumer. In this way, human resources can be conserved for business owners, and the consumers may enjoy a new consumption experience. Relevant embodiments are provided as follows.

Figure 1:
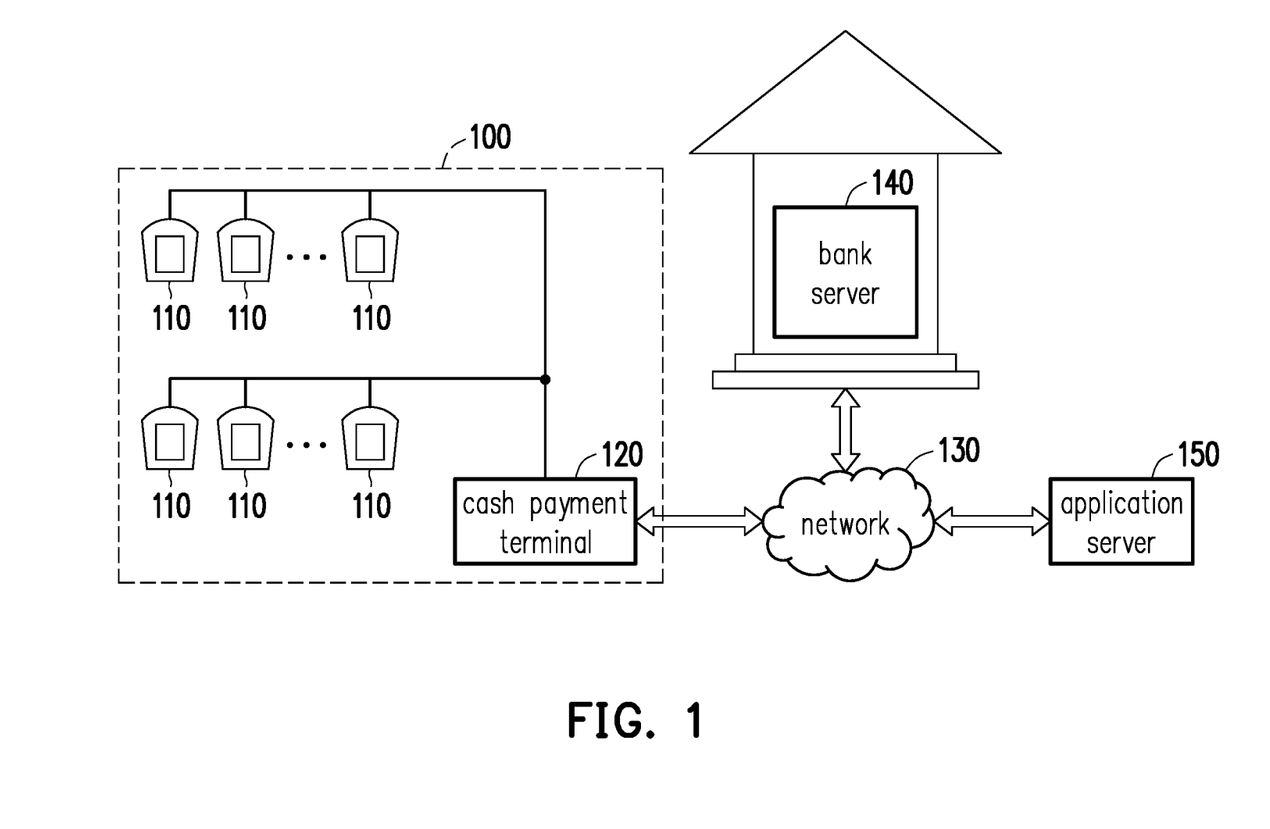
FIG. 1 is a schematic diagram of a cash handling system and related apparatuses according to an embodiment of the disclosure.

FIG. 1 is a schematic diagram of a cash handling system 100 and related apparatuses according to an embodiment of the disclosure. FIG. 1 includes the cash handling system 100, a network 130, a bank server 140, and an application server 150. The cash handling system 100 of the present embodiment may also be called as a point of sale (POS) system, a point of service system, an order and checkout integration system, etc. The cash handling system 100 includes at least one order terminal (e.g., a plurality of order terminals 110 in FIG. 1) and a cash payment terminal 120. The order terminals 110 may be implemented by multiple media kiosks. The cash payment terminal 120 may perform functions of an automatic cash handling apparatus (e.g., a currency-counting machine, a coin machine, a coin hopper, etc.) in addition to related functions of the multiple media kiosks. Hence, the cash payment terminal 120 may be implemented as an automated teller machine (ATM), and installed with a hardware module equipped with functions compliant with the functions described in the embodiments of the disclosure. Cost of installing the cash payment terminal 120 is thereby greater than that of installing the order terminals 110.

The cash payment terminal 120 may be connected to the bank server 140 and/or the application server 150 through the network 130. In this embodiment, payments can be made to the cash payment terminal 120 through electronic vouchers, magnetic stripe credit cards or wireless credit cards, radio frequency identification (RFID)-based sensing, barcode scanning by mobile phones, and other similar payment methods in addition to the use of physical currency (e.g., bills and/or coins). Hardware corresponding to these payment methods is required to be installed at the cash payment terminal 120. Moreover, the cash payment terminal 120 is required to be connected to the bank server 140 of a specific bank or a specific company, perform data verification of consumers, and receive consumer's payment, so as to complete a payment operation. In other words, the cash payment terminal 120 of the present embodiment is equipped with a hardware apparatus to receive physical currency. People applying the present embodiment may build the cash payment terminal 120 with a variety of payment functions customized to their needs.

The application server 150 may also be a part of the cash handling system 100. In this embodiment, information such as consumer data and preferences and the likes of the consumers may be stored in the application server 150, so as to allow the order terminals 110 and the cash payment terminal 120 to download such information from the application server 150 through the network 130. In this way, the order terminals 110 and the cash payment terminal 120 may enhance consumers' experiences through capability of personalization. In some embodiments, the application server 150 may share computation load required for face recognition and the identification technique performed by the order terminals 110 and the cash payment terminal 120 through the network 130.

Each of the order terminals 110 may capture a first image, and at least one piece of first face data is included in the first image. The "first face data" is face data corresponding to a user captured/identified from the first image or obtained through analyzing the first image. The first face data, for example, is data composed of 128 or 256 facial feature points. The order terminal 110 obtains order data and generates client data according to the order data and the first face data in the first image. The first face data is linked to the order data. The client data can be transmitted to the cash payment terminal 120 or the application server 150, and the transmission of the client data is described in the embodiments as follows. The cash payment terminal 120 obtains the client data, and the client data may include the order data and the first face data. The cash payment terminal 120 captures a second image. Further, when the cash payment terminal 120 or the application server 150 determines that one piece of specific face data of a plurality of pieces of first face data appears in the second image, the cash payment terminal 120 performs an operation according to specific order data linked to the specific face data. The order terminals 110 and the cash payment terminal 120 of this embodiment may be implemented in a variety of ways, which are described as follows.

Figure 2:
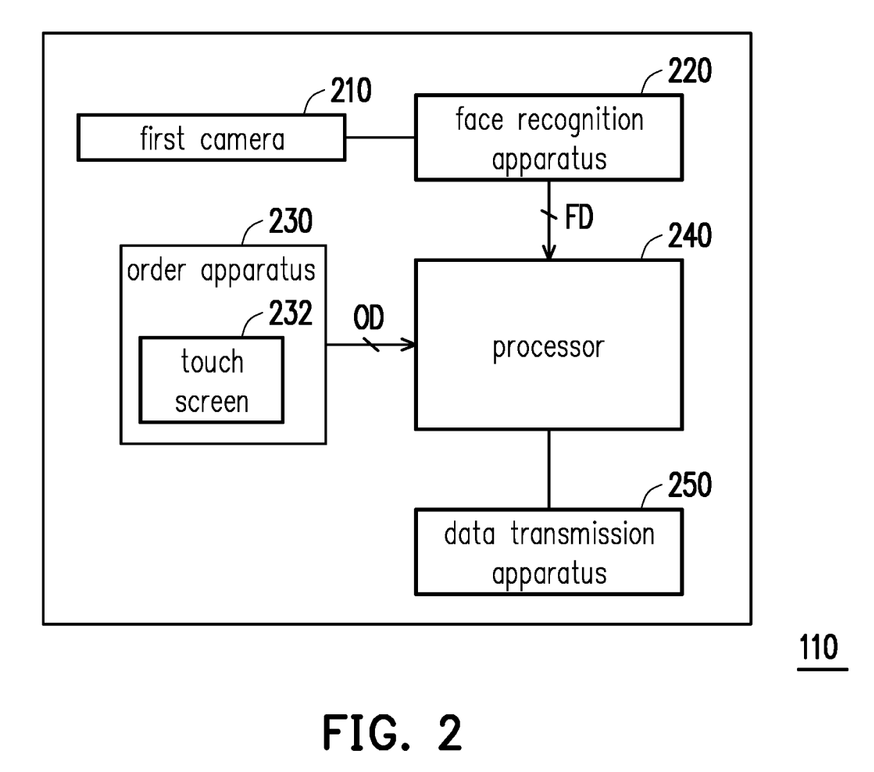
FIG. 2 is a block diagram of an order terminal in FIG. 1 in a first embodiment.
Figure 3:
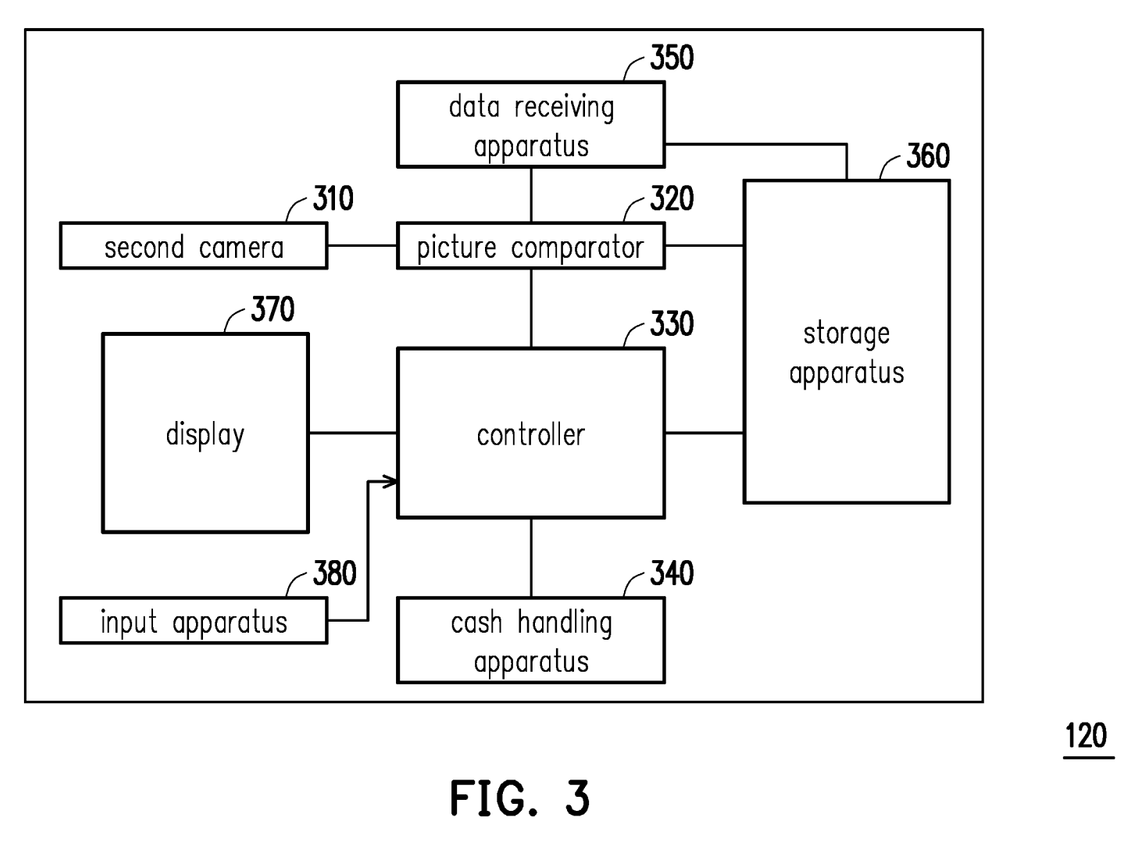
FIG. 3 is a block diagram of a cash payment terminal in FIG. 1 in the first embodiment.

FIG. 2 and FIG. 3 of a first embodiment of the disclosure respectively describe how the order terminals 110 and the cash payment terminal 120 analyze the face data from an image through hardware apparatuses installed thereon (e.g., a face recognition apparatus and/or an image comparator) or determine whether a face appears or whether a face similar to the face data appears in the image without uploading the image to the application server 150 for face recognition and/or image comparison. FIG. 2 is a block diagram of one of the order terminals 110 in FIG. 1 in the first embodiment. With reference to FIG. 2, the order terminal 110 mainly includes a first camera 210, a face recognition apparatus 220, an order apparatus 230, and a processor 240. The face recognition apparatus 220 is coupled to the first camera 210 and the processor 240, and the order apparatus 230 is coupled to the processor 240. The order terminal 110 further includes a data transmission apparatus 250, and the data transmission apparatus 250 is coupled to the processor 240 to communicate with the cash payment terminal 120. The face recognition apparatus 220 may be implemented through operation of the processor 240 by using a hardware circuit or a process. The processor 240 and a controller 330 in FIG. 3 may be field programmable gate arrays (FPGAs), application specific integrated circuits (ASICs), or digital signal processors (DSPs).

In this embodiment, a consumer himself/herself acts as a user of the order terminal 110. The order apparatus 230 generates order data OD through user input. The order apparatus 230 of the present embodiment includes a touch screen 232, and the user may place an order through the touch screen 232. When the user places the order through the order apparatus 230 in the order terminal 110, the first camera 210 may simultaneously capture a first image of the user currently using the order terminal 110. The present embodiment does not limit how the first camera 210 is used to capture images. For instance, one or a plurality of the first cameras 210 can be used to capture images of the user at different angles or at different time points. The first camera 210 may also be configured to provide a special specification (e.g., providing a specific resolution) to capture the images of the user. Alternatively, the first camera 210 may capture a number of images at different time points and treat the clearest image among the images as the first image or treat all these images as the first image.

The face recognition apparatus 220 receives and analyzes the first image, so as to obtain a face picture of the user from the first image and capture a biological feature of the face picture of the user to act as first face data FD. The "face data" of the present embodiment may be image data of the entire face or part of the face. People applying the present embodiment may implement the present embodiment based on face picture statistics required by a face recognition algorithm used by the face recognition apparatus 220. For instance, if the face recognition algorithm requires only eyes and nose data in a face to determine a corresponding consumer, the face data may include only the eyes and nose data corresponding to the consumer. Hence, complete face data corresponding to the consumer may not be needed. In this embodiment, a plurality of feature points (e.g., 128 or 256 feature points) of the face picture of the consumer may be collected through the first camera 210 to serve as data content corresponding to the face picture.

After the user places the order and generates the order data OD, the processor 240 links the order data OD and the first face data FD together to generate client data. In this embodiment, each order data OD is assigned with a corresponding order number, and the order number of the order data OD is added to the corresponding first face data FD. As such, the cash payment terminal 120 in FIG. 1 may link the first face data FD and the corresponding order data OD together through the order numbers. In some embodiments, a corresponding user number may also be assigned to each first face data FD, and the user number may be added to the corresponding order data OD, so as to link the first face data FD and the corresponding order data OD together through the user number.

In this embodiment, the face recognition apparatus 220 may analyze/capture the first face data FD in advance, and the processor 240 may thus treat the first face data FD as the client data to transmit to the cash payment terminal 120. The cash payment terminal 120 can thereby perform data clustering as soon as possible by using the first face data FD, so as to increase face recognition efficiency. After the order data OD is generated, the processor 240 then links the user number corresponding to the first face data FD and the order data OD together and treats such data as the client data to transmit to the cash payment terminal 120. In the present embodiment, the order data OD and the corresponding first face data FD are not required to be appear simultaneously in the client data, and people applying the present embodiment may adjust an order of transmitting the order data OD and the first face data FD in the client data according to actual needs.

In this embodiment, if the face recognition apparatus 220 simultaneously identifies the first face data FD of several consumers, the face recognition apparatus 220 may link all of the first face data FD to one single piece of order data OD. Alternatively, if the face recognition apparatus 220 simultaneously identifies the first face data FD of several consumers and the order apparatus 230 generates several pieces of order data OD at the same time, the face recognition apparatus 220 may link all of the first face data FD to all of the order data OD.

In the present embodiment, the processor 240 of the order terminal 110 may use the data transmission apparatus 250 to transmit the client data including the first face data FD and the order data OD to the cash payment terminal 120 of FIG. 1. In some embodiments, the processor 240 in the order terminal 110 may also use the data transmission apparatus 250 to download a consumption history of the user corresponding to the first face data FD from the application server 150 of FIG. 1 to serve as a reference for the user when generating the order data OD. In other words, when the user approaches the order terminal 110, the order terminal 110 may perform face recognition in advance to obtain the first face data FD, so as to download data such as the consumption history of the user, products/services ordered by the user before, user preferences, etc. corresponding to the first face data FD from the application server 150. In this way, the user may easily build the current order data OD through using such data.

FIG. 3 is a block diagram of the cash payment terminal 120 in FIG. 1 in the first embodiment. With reference to FIG. 3, the cash payment terminal 120 includes a second camera 310, a picture comparator 320, the controller 330, and a cash handling apparatus 340. The second camera 310 is a camcorder or a camera. The picture comparator 320 may determine whether the user corresponding to the pieces of first face data appears in the second image by using the pieces of first face data. The picture comparator 320 is similar to the face recognition apparatus 220 in FIG. 2 and may be implemented by using a hardware circuit or a process through the controller 330. The cash handling apparatus 340 is an automatic apparatus used for collecting physical currency and may include a corresponding apparatus having other payment functions. The cash payment terminal 120 of this embodiment further includes a data receiving apparatus 350, a storage apparatus 360, a display 370, and an input apparatus 380. The display 370 is configured to present data such as the order data, payment information, etc., and the input apparatus 380 may be a keyboard, a mouse, or a touch panel to be used for inputting specific data or to be used to interact with the cash payment terminal 120. The storage apparatus 360 may be a non-volatile memory, such as a hard drive, a cache memory, and the like.

The controller 330 receives the client data from each of the order terminals 110 through the data receiving apparatus 350, so as to obtain the pieces of first face data and a plurality of pieces of order data linked to the pieces of first face data. The second camera 310 captures a second image including the face of the current user, and the picture comparator 320 determines whether one of the pieces of first face data in the client data appears in the second image. In this embodiment, face data identified by the picture comparator 320 is called as specific face data. That is, the specific face data is one of the pieces of first face data in the client data. When the specific face data appears in the second image, the picture comparator 320 notifies the controller 330 and provides the specific face data. The controller 330 performs the payment operation according to specific order data linked to the specific face data through the cash handling apparatus 340. The specific order data is one of the pieces of order data in the client data.

In order to prevent users from waiting in a long line in front of the cash payment terminal 120, the order terminals 110 of FIG. 1 are expected to accurately obtain the first face data of the users, and the cash payment terminal 120 of FIG. 1 is expected to efficiently deliver face recognition. Therefore, in this embodiment, a face picture having a greatest area in the first image captured by the order terminal 110 is configured to act as a basis for generating the first face data FD. Another embodiment is to implement the first camera in the order terminal 110 (e.g., the first camera 210 in FIG. 2) with a camera having a function of detecting depth of field. In this way, the order terminal 110 determines the user closest to the first camera and captures the face picture of the closest user (this user should be the person who is operating the order terminal 110). The image captured is used as a basis for generating the first face data FD. Moreover, the second camera (e.g., the second camera 310 in FIG. 3) of the cash payment terminal 120 can also be implemented with a camera having the function of detecting depth of field. With this, the cash payment terminal 120 uses the second camera to determine the closest user and perform face recognition on the closest user (this user should be the person who is operating the cash payment terminal 120) to accurately determine the user's face data. In addition, in this embodiment, the obtained pieces of first face data may be clustered in advance, so as to reduce the data volume of the face data, increase the accuracy of the face recognition, and increase face recognition efficiency and success rate of the cash payment terminal 120. Related embodiments are described one by one as follows.

Figure 4A:
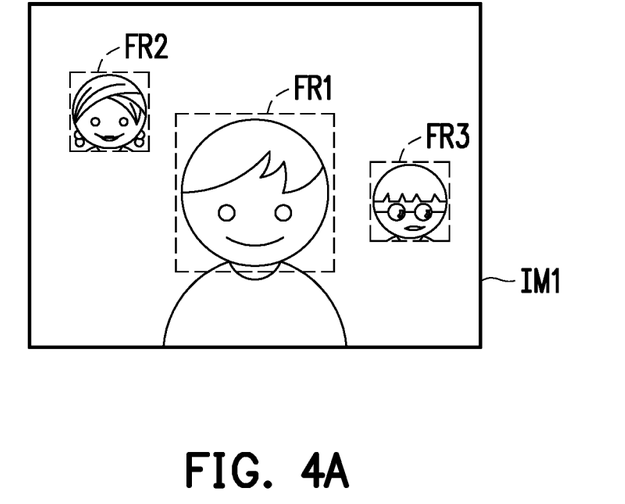
FIG. 4A is a schematic view of a first image captured by the order terminal.

FIG. 4A is a schematic view of a first image IM1 captured by the order terminal 110. With reference to FIG. 4A, when capturing the first image IM1 if the order terminal 110 of FIG. 1 detects several face pictures (e.g., face pictures FR1, FR2, and FR3 in FIG. 4A), when the face pictures are to be analyzed to obtain the first face data, in order to reduce the data volume and increase resolution of the face data of the user, the order terminal 110 treats the face picture having the largest area (e.g., the face picture FR1 in the first image IM1) as the basis for generating the first face data FD. Because the face picture FR1 occupies a larger area in the first image IM1, related features of the face are to be analyzed more accurately. In some embodiments, since the user who is using the order terminal 110 is expected to look at the order terminal 110 for a long time, gazing directions of the face pictures FR1, FR2, and FR3 may also be analyzed to see whether the gazing directions directly face the order terminal 110. The face picture FR1 having the gaze direction directly facing the order terminal 110 and having the largest area is used as the basis for generating the first face data FD. In some embodiments, the step of analyzing the first image and generating the first face data FD may be implemented by the application server 150 of FIG. 1. Therefore, the application server 150 may also treat the face picture having the greatest area in the first image as the basis for generating the first face data FD.

Figure 4B:
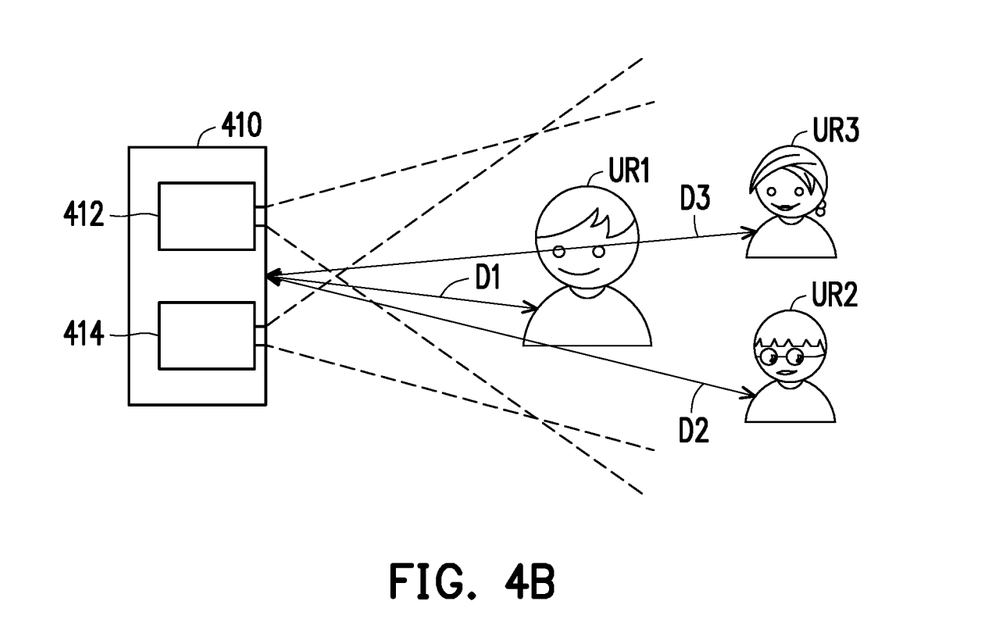
FIG. 4B is a schematic diagram of a camera of either or both of an order terminal or a cash payment terminal using a function of detecting depth of field to capture images and determine corresponding depth of field distance.

FIG. 4B is a schematic diagram of a camera of either or both of an order terminal or a cash payment terminal using a function of detecting depth of field to capture images and determine corresponding depth of field distance. FIG. 4B includes a camera 410 (including two camera lenses 412 and 414) having the function of detecting depth of field and face pictures of a plurality of users UR1 to UR3. In detail, the camera 410 uses the images captured by the camera lens 412 and the camera lenses 414 with a partially overlapping field of view to detect a distance between each face picture and the camera. For example, the face picture of the user UR1 has a depth of field distance D1 corresponding to the camera 410; the face picture of the user UR2 has a depth of field distance D2 corresponding to the camera 410; and the face picture of the user UR3 has a depth of field distance D3 corresponding to the camera 410.

Assuming the camera 410 is the first camera and is mounted on the order terminal 110, the order terminal 110 obtains the face pictures of the users UR1 to UR3 by the first image captured by the camera 410, and through the corresponding depth of field distances D1 to D3 to determine closest user. For example, as shown in FIG. 4B, the depth of field distance D1 is shorter than the depth of field distances D2 and D3. Therefore, the order terminal 110 can know that the user UR1 is a person who is closer to the order terminal 110. In addition, the order terminal 110 can preferentially perform face capture and face recognition on the face picture of the user UR1 having the shortest depth of field distance D1, thereby obtaining detailed first face data FD. That is, the face picture of the user UR1 is used as the basis for generating the first face data FD. From another point of view, assuming the camera 410 is the second camera and is installed on the cash payment terminal 120, the cash payment terminal 120 obtains the face pictures of the users UR1 to UR3 by the second image captured by the camera 410. With the corresponding depth of field distances D1 to D3, the depth of field distances D1 to D3 are used to determine that the user closest thereto is the user UR1. Therefore, the cash payment terminal 120 knows that the user UR1 is a person who is closer to the cash payment terminal 120. In addition, the cash payment terminal 120 preferentially performs face recognition comparison on the face picture of the user UR1, thereby identifying the specific face data as soon as possible.

The camera 410 of FIG. 4B illustrates the depth of field distance of each face picture obtained by the two camera lenses 412 and 414 utilizing a stereoscopic vision technique with dual lenses. Other camera types having the function of detecting depth of field may also be used for the present embodiment. For example, infrared light, laser light, etc. can be used to determine the depth of field distance corresponding to each user, and is not limited to stereoscopic vision technology.

Figure 5:
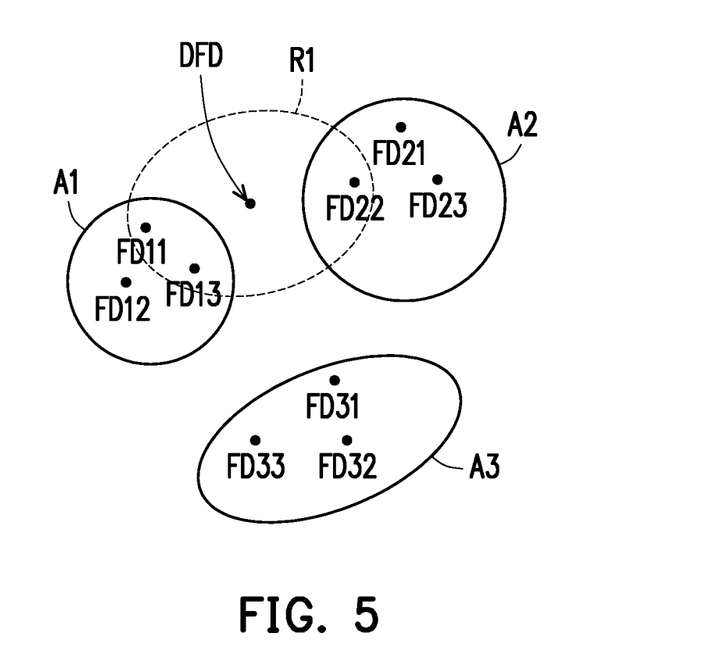
FIG. 5 is a schematic diagram of clustering a plurality of pieces of first face data through a data clustering algorithm.

In order to increase face recognition efficiency of the cash payment terminal 120, in this embodiment, the cash payment terminal 120 may cluster the pieces of first face data FD of each user obtained at different time points or at different angles in advance according to a data clustering algorithm, and determines the specific face data appeared in the second image is owned by which user according to the clustered first face data FD of the users, so that the face recognition efficiency of the cash payment terminal 120 is enhanced. FIG. 5 is a schematic diagram of clustering the pieces of first face data through the data clustering algorithm. With reference to FIG. 3 and FIG. 5 together, the picture comparator 320 and/or the controller 330 of the cash payment terminal 120 may divide the pieces of first face data in the client data into a plurality of face data clusters according to the data clustering algorithm and cluster the pieces of first face data of the same user into the same face data cluster. Each of the face data clusters respectively corresponds to each of the users. That is, the pieces of first face data in the same face data cluster are the pieces of the first face data in the first images of the corresponding user captured at different time points and/or at different capturing angles. For instance, taking FIG. 5 for example, pieces of first face data FD11, FD12, and FD13 located in a face data cluster A1 belong to a first user; pieces of first face data FD21, FD22, and FD23 located in a face data cluster A2 belong to a second user; pieces of first face data FD31, FD32, and FD33 located in a face data cluster A3 belong to a third user. The picture comparator 320 and/or the controller 330 in the cash payment terminal 120 may generate and train a dataset according to the data clustering algorithm and the face data clusters A1 to A3 to be used for the following face recognition. The dataset may be all or part of a face database.

After the cash payment terminal 120 obtains the second image, the picture comparator 320 analyzes/identifies the second image to obtain second face data DFD in the second image. In order to determine which user the second face data DFD belongs to, the picture comparator 320 uses the data clustering algorithm (e.g., a k-nearest neighbors (KNN) algorithm) to find a plurality of pieces of similar face data similar to the second face data DFD and located in the first face data from the dataset. For instance, the KNN algorithm uses a method similar to space mapping so as to find the pieces of similar face data (e.g., the pieces of face data FD11, FD13, and FD22) of a pre-determined number (e.g., 3) in a region R1 close to the second face data DFD. People applying the present embodiment may adjust a value of the pre-determined number according to needs, for example, 3, 5, 7, etc. or adjust a size of the region R1 close to the second face data DFD. The picture comparator 320 then determines the user corresponding to the second face data DFD according to the divided face data clusters of the pieces of similar face data FD11, FD13, and FD22, so as to obtain the specific face data. Taking FIG. 5 for example, since the two pieces of similar face data FD11 and FD13 are clustered in the face data cluster A1, and the single piece of similar face data FD22 is clustered in face data cluster A2, it means that the second face data DFD is similar to a first user corresponding to the face data cluster A1. Therefore, the picture comparator 320 determines that the second face data DFD is the first user and performs the following operation based on the specific face data, the user number, or the specific order data linked to the user number corresponding to the first user. Through the above operation, the KNN algorithm may then be used to increase face recognition efficiency of the picture comparator 320, and indexing may be performed through the trained dataset without searching all of the face data.

In some embodiments, when the cash payment terminal 120 of FIG. 1 completes the payment operation of the specific order data, the cash payment terminal 120 may then delete the specific face data linked to the specific order data. In this way, a total number of the pieces of first face data in the face database is reduced. Hence, if the specific face data linked to the specific order data of which payment operation is completed is deleted, face recognition performed by the cash payment terminal 120 on other users may be accelerated. In addition, deleting the face data of the user may prevent violating a user's privacy. Note that the specific order data is kept for subsequent transaction integration, reimbursement, and/or transaction recording conducted by the business owner, and only the specific face data corresponding to the user who completes the payment operation is deleted in the embodiments of the disclosure.

In some embodiments, after the payment operation of the specific order data is completed, the cash payment terminal 120 of FIG. 1 may transmit the specific face data and the linked specific order data to the application server 150 of FIG. 1 through network transmission, so as to record the consumption history of the user corresponding to the specific face data. The consumption history may serve as a reference for the user when using the order terminal 110 next time. To be specific, after obtaining the first face data, the order terminal 110 may communicate with the application server 150 through the network 130 and downloads the consumption history of the user corresponding to the first face data from the application server 150, so as to provide a reference to the user when generating the order data.

With reference to FIG. 2, in the order terminal 110 and the cash payment terminal 120 of this embodiment, the user is determined mainly based on biological feature data (i.e., the face data) of the user, but explicit feature data related to the user may also act as supporting data used to identify the user. The explicit feature data includes, for example, clothes colors of the user, glasses and accessories worn by the user, and the like. That is, the face recognition apparatus 220 in the order terminal 110 further analyzes the first image to obtain the explicit feature data related to the user. The processor 240 in the order terminal 110 links the first face data, the explicit feature data, and the order data together to generate the client data and transmits the client data to the cash payment terminal 120, as such the user may be identified more accurately.

Figure 6:
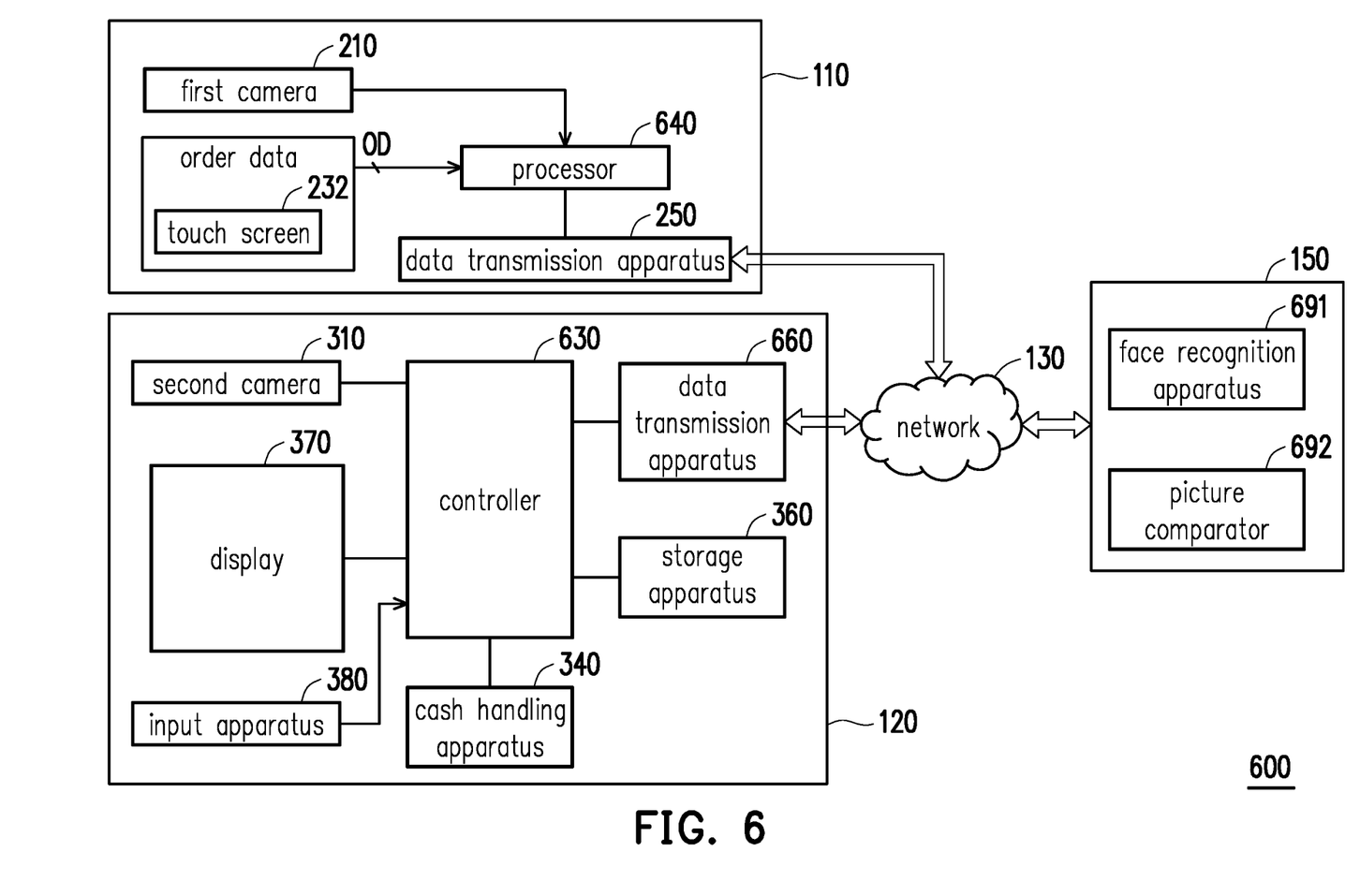
FIG. 6 is a schematic diagram of a cash handling system and related apparatuses according to a second embodiment of the disclosure.

FIG. 6 is a schematic diagram of a cash handling system 600 and related apparatuses according to a second embodiment of the disclosure. In the second embodiment (e.g., as shown in FIG. 6), the order terminal 110 and the cash payment terminal 120 may transmit the individually-captured first image and the second image to the application server 150 through the network 130, as such, hardware establishment costs of the order terminal 110 and the cash payment terminal 120 are reduced. In other words, the order terminal 110 and the cash payment terminal 120 in the second embodiment are not required to have the face recognition apparatus and/or the picture comparator disposed therein.

With reference to FIG. 6, the application server 150 communicates with each order terminal 110 and the cash payment terminal 120 through the network 130. The application server 150 includes a face recognition apparatus 691 and a picture comparator 692. A processor 640 in the order terminal 110 transmits the first image corresponding to the order data OD to the application server 150. The face recognition apparatus 691 in the application server 150 analyzes the first image to obtain the first face data FD, and the application server 150 further links the order number and the first face data FD corresponding to the order data OD together. From another perspective, the second camera 310 in the cash payment terminal 120 captures the second image, and a controller 630 of the cash payment terminal 120 transmits the second image to the application server 150 through a data transmission apparatus 660. The picture comparator 692 of the application server 150 identifies whether one piece of specific face data in the pieces of first face data FD appears in the second image. When the application server 150 identifies that the specific face data appears in the second image, the application server 150 provides the order number corresponding to the specific face data to the cash payment terminal 120. The controller 630 of the cash payment terminal 120 obtains the order number from the application server 150 through the data transmission apparatus 660 and performs the payment operation on the user according to the specific order data corresponding to the order number. In this way, in the second embodiment, the application server 150 may be used to analyze the first face data in the first image and identify whether one piece of specific face data in the pieces of first face data appears in the second image. As such, hardware costs of building the face recognition technique required in the order terminals 110 and the cash payment terminal 120 are reduced.

Figure 7:
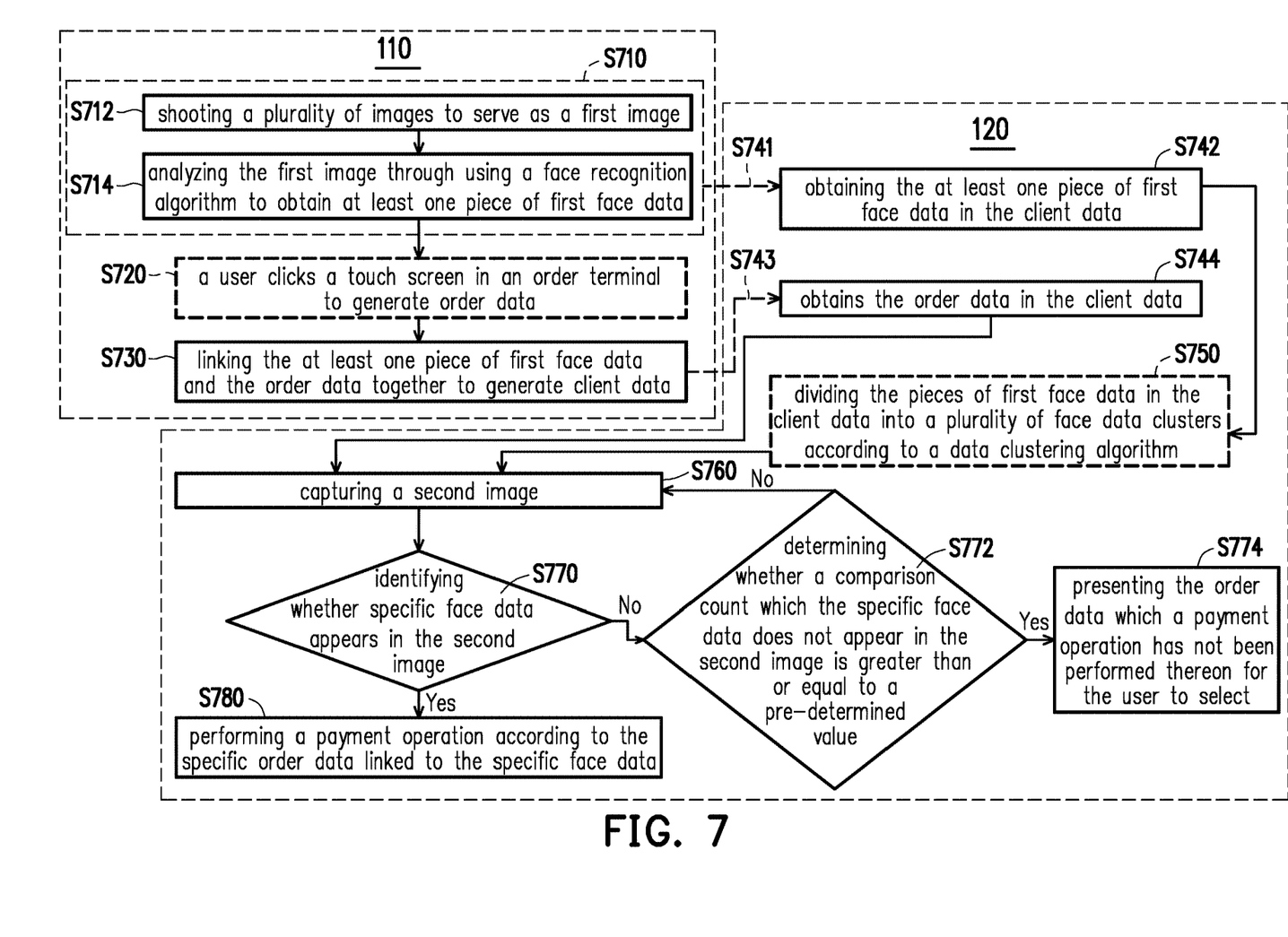
FIG. 7 is a flowchart of a cash transaction method according to an embodiment of the disclosure.

FIG. 7 is flowchart of a cash transaction method according to an embodiment of the disclosure. The cash transaction method described in FIG. 7 may be implemented by using the cash handling system 100 in FIG. 1. With reference to FIG. 1 and FIG. 7 together, in the present embodiment, step S710 to step S730 may be implemented through the devices (e.g., the first camera 210, the face recognition apparatus 220, the order apparatus 230 and/or the processor 240 in FIG. 2) in the order terminal 110, and step S742, step S744, step S760 to step S780 may be implemented through the devices (e.g., the second camera 310, the picture comparator 320 and/or the controller 330 in FIG. 3) in the cash payment terminal 120. Step S741, step S743, and step S740 and step S745 in FIG. 8 may be implemented through the data transmission apparatus 250 (FIG. 2) and the data receiving apparatus 350 (FIG. 3) in the order terminal 110. In step S710, the order terminal 110 captures a first image of a current user and analyzes the first image to obtain at least one piece of first face data. Step S710 may be implemented through step S712 and step S714. In step S712, the first camera in the order terminal 110 shoots a plurality of images to serve as the first image. For instance, the first camera in the order terminal 110 shoots several images and treats a clearest image among the images as the first image. Alternatively, the first camera in the order terminal 110 shoots several images and treats these images as the first image. In step S714, the order terminal 110 analyzes the first image through using the face recognition algorithm to obtain the at least one piece of first face data. If the first face data is analyzed/identified in step S710, the first face data in the client data may be transmitted to the cash payment terminal 120 through step S741 in this embodiment. People applying the present embodiment may know that it is not required to wait for step S730 to complete to transmit the first face data to the cash payment terminal 120. The reason is that in this embodiment, since the cash payment terminal 120/the application server 150 is to perform operations such as performing the data clustering algorithm in the following step S750, and these operations require large computation load and take up much time, the first face data is thus transmitted to the back-end cash payment terminal 120/the application server 150 in advance in this embodiment. In this way, the cash payment terminal 120/the application server 150 may be used effectively, so as to reduce back-end operation time and allows the user to enjoy a more favorable consumption experience.

In step S720, the user clicks a touch screen in the order terminal 110 to generate order data. Note that people applying the present embodiment may obtain the order data through other ways. The user does not have to click the touch screen to order. The user may upload the completed order data to the order terminal 110 through an application in a smartphone. In step S730, the order terminal 110 links the at least one piece of first face data and the order data together to generate the client data. If the order data in step S730 is completed, the order data in the client data and related data linking the first face data and the order data together may be transmitted to the cash payment terminal 120 through step S743 in this embodiment.

The order terminal 110 transmits the client data to the cash payment terminal 120 from each order terminal 110, as such, the cash payment terminal 120 receives the client data and thus obtains the pieces of first face data and the pieces of order data connected to the pieces of first face data. The above steps are implemented through step S741 to step S744 in this embodiment. In step S742, the cash payment terminal 120 obtains the at least one piece of first face data in the client data. In step S744, the cash payment terminal 120 obtains the order data in the client data. In step S744, the order data also includes the related data linking the first face data and the order data together.

In order to enhance face recognition efficiency of the cash payment terminal 120, the step S750 is performed after step S742, and the cash payment terminal 120 divides the pieces of first face data in the client data into face data clusters according to the data clustering algorithm (e.g., the KNN algorithm), and each of the face data clusters corresponds to each of the users. People applying the present embodiment may enhance face recognition efficiency of the cash payment terminal 120 through other ways, and it thus can be seen that step S750 is not a required step.

In step S760, the cash payment terminal 120 captures a second image of the current user. In step S770, the cash payment terminal 120 identifies whether the specific face data appears in the second image. To be specific, the cash payment terminal 120 obtains the second face data DFD from the second image. In order to determine which user does the second face data DFD belong to, the cash payment terminal 120 uses the data clustering algorithm (the KNN algorithm) to find the pieces of similar face data of the pre-determined number similar to the second face data DFD from the dataset. The cash payment terminal 120 then determines the user corresponding to the second face data DFD according to the divided face data clusters of the pieces of similar face data FD11, FD13, and FD22, so as to obtain the specific face data. If the specific face data appears in the second image (yes in step S770), step S780 is performed after step S770, and the cash payment terminal 120 performs the payment operation according to the specific order data linked to the specific face data.

In contrast, if the specific face data does not appear in the second image (no in step S770), it means that the second image cannot be successfully identified owing to factors such as the second image is excessively blurred. Therefore, the controller in the cash payment terminal 120 sets a comparison count, and the comparison count is a count which no first face data appears in the second image. Face recognition is tentatively repeated by using the comparison count until the comparison count is greater than or equal to a pre-determined value.

To be specific, when no is recorded in step S770, step S772 is performed after step S770, and the cash payment terminal 120 determines whether the comparison count of which the specific face data does not appear in the second image is greater than or equal to the pre-determined value. When the comparison count is not greater than or equal to the pre-determined value (no in step S772), step S760 is performed after step S772, and the controller in the cash payment terminal 120 adds 1 to the comparison count, controls the second camera to re-capture the second image (step S760), and controls the picture comparator to re-determine whether the specific face data appears in the second image (step S770). When the comparison count is not greater than or equal to the pre-determined value (yes in step S772), step S774 is performed after step S772, and the cash payment terminal 120 uses the display to present the order data which the payment operation has not been performed thereon for the user to select and performs the payment operation through the selected order data. Detailed operation of each step in FIG. 7 may be obtained with reference to the foregoing embodiments.

Figure 8:
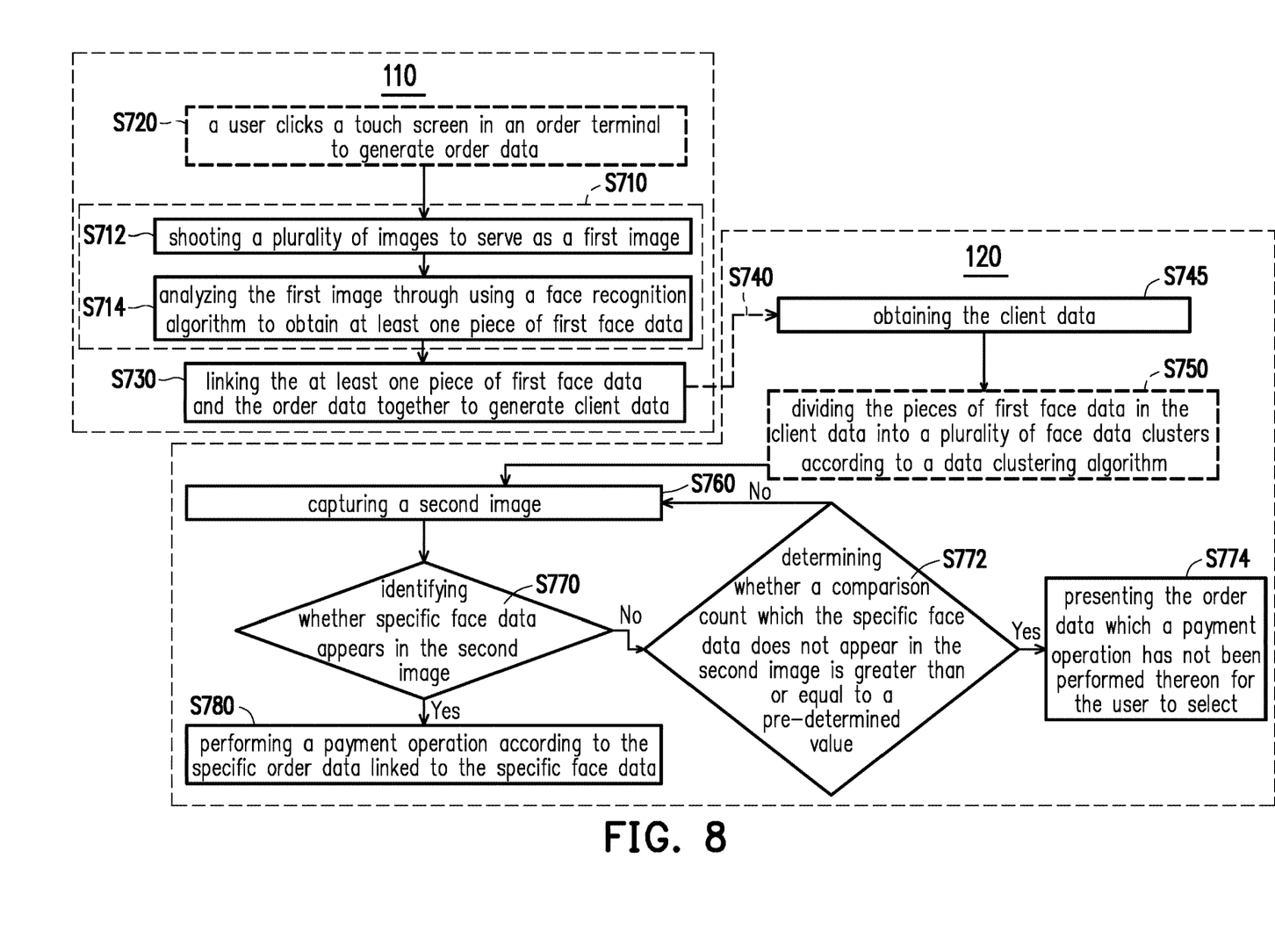
FIG. 8 is a flowchart of a cash transaction method according to another embodiment of the disclosure.

FIG. 8 is flowchart of a cash transaction method according to another embodiment of the disclosure. A difference between FIG. 7 and FIG. 8 is the order terminal 110 in FIG. 8 does not transmit the face data to the cash payment terminal 120 in advance (i.e., S741 is omitted in FIG. 8). Alternatively, the order terminal 110 performs step S740 after step S730 is performed and the client data is generated, so as to transmit the entire client data to the cash payment terminal 120. The client data includes the first face data and the linked order data. The cash payment terminal 120 obtains the client data in step S745. After the client data is obtained, step S750 is performed so as to divide the pieces of first face data in the client data into the face data clusters according to the data clustering algorithm and continue the following steps. Therefore, people applying the present embodiment may adjust the order of transmitting the order data OD and the first face data FD in the client data according to needs. Detailed operation of each of other steps in FIG. 8 may be obtained with reference to the foregoing embodiments.

Figure 9:
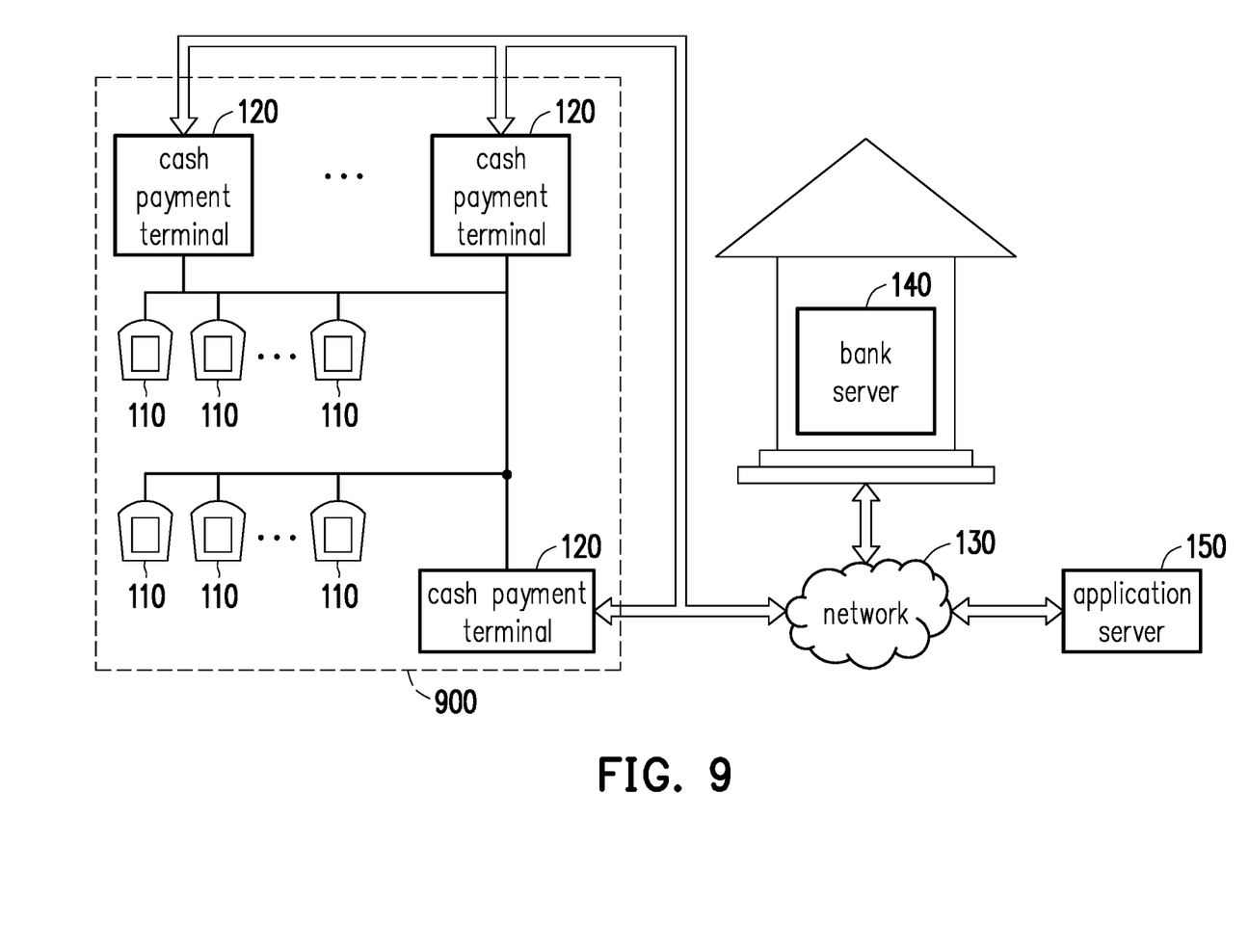
FIG. 9 is a schematic diagram of a cash handling system and related apparatuses according to a third embodiment of the disclosure.

FIG. 9 is a schematic diagram of a cash handling system 900 and related apparatuses according to a third embodiment of the disclosure. A cash handling system 900 may further include a plurality of cash payment terminals 120 in addition to the order terminals 110. In this way, after the user places order and performs the foregoing operation on one of the order terminals 110, the user may approach one of the cash payment terminals 120 to pay. The crowd attempting to make payment may be dispersed, and the user may thereby enjoy a favorable consumption experience.

In view of the foregoing, in the embodiments of the disclosure, when the user places an order on one of the order terminals, the face recognition technique is used to capture the face feature data of the user to act as a basis for identification, and the face feature data and the order data are linked together to act as the client data. After the user completes ordering, the client data is transmitted from the order terminal to the cash payment terminal or the application server. The cash payment terminal or the application server identifies the user in front of the camera of the cash payment terminal through the face feature data in the client data. Further, after identifying the specific face feature data, the cash payment terminal performs the payment operation through order data linked to the specific face feature data. In this way, the cash payment terminal may link the order data and the face feature data of the consumer together without manual operation, as such, human resources may be conserved at the cash payment terminal or the cash payment counter. Further, in the embodiments, the face picture having a large area in the first image acts as the basis for generating the first face data, and the first face data is clustered through the data clustering algorithm. In this way, data volume of the first face data is reduced, face recognition is more accurate, and face recognition efficiency and success rate of the cash payment terminal are enhanced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A cash handling system, enabling a subsequent payment operation on order data corresponding to a consumer for selecting related products or services, comprising:
at least one order terminal, comprising a first camera configured to capture a first image; and a cash payment terminal, comprising a second camera configured to capture a second image, wherein the cash payment terminal performs functions of an automatic cash handling apparatus and communicates with the at least one order terminal, wherein the at least one order terminal performs the following steps:
capturing the first image, wherein the first image comprises at least one piece of first face data corresponding to the consumer;
transmitting at least one piece of first face data to the cash payment terminal before the order terminal completes linking the at least one piece of first face data and the order data together to generate a client data;
obtaining the order data inputted by the consumer at the at least one order terminal and generating the client data according to the order data and the at least one piece of first face data,
wherein the cash payment terminal divides the at least one piece of first face data into a plurality of face data clusters according to a data clustering algorithm after obtaining the at least one piece of first face data, wherein each of the face data clusters corresponds to each of consumers,
wherein the cash payment terminal obtains the client data and captures the second image and looks for a plurality of pieces of similar face data similar to second face data and located in the at least one piece of first face data by using the second face data obtained by analyzing the second image according to the data clustering algorithm and determines the consumer corresponding to face data to be determined according to the divided face data cluster of the pieces of similar face data to obtain a specific face data,
wherein the cash payment terminal enables the payment operation in response to the specific face data appears in the second image.

* * * * *